US006966417B2

(12) United States Patent
Peklo et al.

(10) Patent No.: US 6,966,417 B2
(45) Date of Patent: Nov. 22, 2005

(54) COIN CHUTE

(75) Inventors: John C. Peklo, Bartlett, IL (US); John S. Lykowski, Glenview, IL (US); John R. Blake, St. Charles, IL (US)

(73) Assignee: Cummins-Allison Corp., Mt. Prospect, IL (US)

(*) Notice: Subject to any disclaimer, the term of this patent is extended or adjusted under 35 U.S.C. 154(b) by 4 days.

(21) Appl. No.: 10/361,549

(22) Filed: Feb. 10, 2003

(65) Prior Publication Data

US 2004/0154899 A1   Aug. 12, 2004

(51) Int. Cl.[7] .............................................. G07F 1/04
(52) U.S. Cl. ................ 194/344; 193/DIG. 1; 193/46; 193/2 D
(58) Field of Search .................... 193/46, 2 D, DIG. 1; 194/344, 347; 453/9

(56) References Cited

U.S. PATENT DOCUMENTS

| | | | | |
|---|---|---|---|---|
| 446,303 | A | * | 2/1891 | Thompson .................. 194/202 |
| 480,360 | A | * | 8/1892 | Avery ......................... 194/335 |
| 812,327 | A | * | 2/1906 | Cranner ........................ 453/9 |
| 917,629 | A | * | 4/1909 | Long ........................... 194/338 |
| 1,931,579 | A | * | 10/1933 | Gilchrist et al. ............ 194/326 |
| 4,050,218 | A | * | 9/1977 | Call .............................. 53/167 |
| 4,165,802 | A | * | 8/1979 | Mathews ..................... 194/344 |
| 4,731,043 | A | | 3/1988 | Ristvedt et al. ................ 453/6 |
| 4,911,280 | A | * | 3/1990 | Bruner ........................ 194/338 |
| 4,966,570 | A | | 10/1990 | Ristvedt et al. ................ 453/6 |
| 5,007,079 | A | * | 4/1991 | Vogl et al. .................. 379/145 |
| 5,176,565 | A | | 1/1993 | Ristvedt et al. ................ 453/6 |
| 5,194,037 | A | | 3/1993 | Jones et al. .................. 453/10 |
| 5,297,986 | A | | 3/1994 | Ristvedt ........................ 453/6 |
| 5,370,211 | A | * | 12/1994 | Plana .......................... 194/344 |
| 5,372,542 | A | | 12/1994 | Geib et al. .................... 453/10 |
| 5,401,211 | A | | 3/1995 | Geib et al. .................... 453/10 |
| 5,425,439 | A | * | 6/1995 | Tsuchida .................... 194/344 |
| 5,441,138 | A | * | 8/1995 | Hird et al. .................. 194/345 |
| 5,480,348 | A | | 1/1996 | Mazur et al. ................. 453/10 |
| 5,514,034 | A | | 5/1996 | Jones et al. .................. 453/10 |
| 5,542,881 | A | | 8/1996 | Geib .......................... 453/10 |
| 5,564,546 | A | | 10/1996 | Molbak et al. ............. 194/216 |
| 5,564,978 | A | | 10/1996 | Jones et al. .................. 453/17 |
| 5,676,234 | A | * | 10/1997 | Smith et al. ................ 194/346 |
| 5,782,686 | A | | 7/1998 | Geib et al. .................... 453/10 |
| 5,799,767 | A | | 9/1998 | Molbak ...................... 194/217 |
| 5,915,519 | A | * | 6/1999 | Glaser ........................ 194/345 |
| 6,196,913 | B1 | | 3/2001 | Geib et al. .................... 453/10 |
| 6,206,167 | B1 | * | 3/2001 | Taylor et al. ............... 194/344 |
| 6,264,545 | B1 | | 7/2001 | Magee et al. .................. 453/3 |
| 6,494,776 | B1 | * | 12/2002 | Molbak ........................ 453/32 |

(Continued)

OTHER PUBLICATIONS

Complaint, *Cummins-Allison Corp.* v. *Glory Ltd., Glory Shoji Co. Ltd., and Glory (U.S.A.) Inc.*, Civil Action No. 02C-7008, United States District Court, Northern District of Illinois, Eastern Division.

(Continued)

Primary Examiner—Douglas Hess
(74) Attorney, Agent, or Firm—Jenkens & Gilchrist

(57) ABSTRACT

The invention is related to a coin chute for transporting coins in a coin processing machine. The coin chute includes a first surface, a second surface, and a rolling surface. The rolling surface connects the first surface and the second surface to form generally a V-shape cross-section to the coin chute. The V-shape has an angle $\theta$ between the first and second surface surfaces, and is inclined at an angle $\alpha$ relative to the horizontal. The angles $\theta$ and $\alpha$ are selected to be values that cause the coins to move under a gravitational force and slidably roll across the rolling surface.

31 Claims, 3 Drawing Sheets

U.S. PATENT DOCUMENTS

| | | | |
|---|---|---|---|
| 6,510,936 B2 * | 1/2003 | Smith et al. | 194/346 |
| 6,520,309 B1 * | 2/2003 | Ishida et al. | 194/344 |
| 6,708,811 B2 * | 3/2004 | Roscoe | 194/215 |
| 2002/0130011 A1 | 9/2002 | Casanova et al. | |

OTHER PUBLICATIONS

Billcon Corporation, Brochure for CCS-60/CCS-80 Series Coin Counter-Sorter, 2 pages (Oct. 1999).

Billcon Corporation, Photos for CCS-60/80, 1 page (Japanese language) (Oct. 12, 2000).

De La Rue Cash Systems, Inc., Brochure for ACD Automatic Coin Dispenser, 2 pages, no date.

De La Rue Cash Systems, Brochure for MACH 12 Coin Sorter/Counter, 2 pages (1999).

De La Rue Cash Systems, Brochure for MACH 12HD Coin Sorter/Counter, 2 pages, no date.

Glory, Brochure for GSA-500 Sortmaster, 2 pages, no date.

Magner, Brochure for COINSTREAM™ CPS 502 Self-Service Coin Processing System, 2 pages, no date.

Magner, Brochure for MAG II 100 Series Coin Sorters, 2 pages, no date.

Magner, Brochure for MAG II Model 915 Coin Counter/Packager, 2 pages, no date.

Magner, Brochure for Pelican 305 Coin Sorter, 2 pages, no date.

Magner, Brochure for 900 Series Coin Counters and Packagers, 2 pages, no date.

* cited by examiner

COIN CHUTE

FIELD OF THE INVENTION

The present invention relates generally to coin processing devices and, more particularly, to a coin processing device having a coin chute for transporting coins from an input area to an output area.

BACKGROUND OF THE INVENTION

Coin processing machines generally have the ability to receive bulk coins from a user of the machine. Coin processing machines include a redemption type of machine wherein, after the deposited coins are counted, a receipt is issued indicating the value of the deposited coins. The user may redeem this receipt for the amount of deposited coins in the form of banknotes. In other embodiments, the receipt is redeemed for the amount of the deposited coins less a commission charged for use of the coin redemption machine.

These self-service prior art coin redemption machines are commonly used in a banking environment and/or a retail environment such as a grocery store. In operation, a user inputs (i.e., deposits) a batch of coins of mixed denominations into a hopper of the coin redemption machine. The machine determines the value of the deposited coins and outputs a receipt indicative of the determined amount. In some embodiments, the receipt also indicates a second, lesser amount, which reflects a commission charged for use of the machine. The user redeems the receipt for paper currency for the value of the deposited coins less the commission. For example, in a banking environment, a user redeems the receipt at the teller's window. In a retail environment, the user can redeem the receipt at a cashier's station or a customer-service station.

In general, the coins are sorted by denomination and sent to a coin container, such as a coin bin or a coin bag, for temporary storage until the coin container is removed or emptied. Although the process of sending the coins to the coin container can be as simple as dropping the coins into the coin container, in some instances the coins require additional guidance to the coin container. For example, a coin processing machine that sorts coins by denomination and sends the coins to respective coin bags, requires that rejected coins be sent via a separate coin chute to a separate reject container. Rejected coins are coins, such as foreign coins, game tokens, or blank metal slugs, that do not meet any of a number of coin identification tests. The rejected coins require a separate coin chute for traveling to the reject container. To eliminate cost and complex coin transporting mechanisms, it is advantageous to use the force of gravity for moving the coins from the input area to the reject container.

A problem associated with a coin chute is that the coins dropped in a receiving region of the coin chute tend to slide, rather than roll, along the coin chute. Therefore, the coin chute needs to be inclined at a relatively large angle with respect to the horizontal plane, such that the vertical component of the gravity force overcomes the frictional forces due to sliding contact between surfaces of the coins and surfaces of the coin chute. Inclining the coin chute at a relatively large angle is undesirable because the coin processing machine must be taller than when inclining the coin chute at a relatively small angle. As there is a push for smaller machines, allocating volume to a large-angle coin chute becomes extremely difficult.

Providing a coin chute that would force the received coins to roll, regardless of the coin size or orientation, would solve the above and other problems. There is a need, therefore, for a compact coin processing machine that uses a gravity-induced coin chute.

SUMMARY OF THE INVENTION

Briefly, in accordance with the foregoing, the invention is related to a coin chute for transporting coins in a coin processing machine. The coin chute includes a first surface, a second surface, and a rolling surface. The rolling surface connects the first surface and the second surface to form generally a V-shape cross-section to the coin chute. The V-shape has an angle $\theta$ between the first and second surface surfaces, and is inclined at an angle $\alpha$ relative to the horizontal. The angles $\theta$ and $\alpha$ are selected to be values that cause the coins to move under a gravitational force and slidably roll across the rolling surface.

BRIEF DESCRIPTION OF THE DRAWINGS

The foregoing and other advantages of the invention will become apparent upon reading the following detailed description and upon reference to the following drawings

Figure 1:
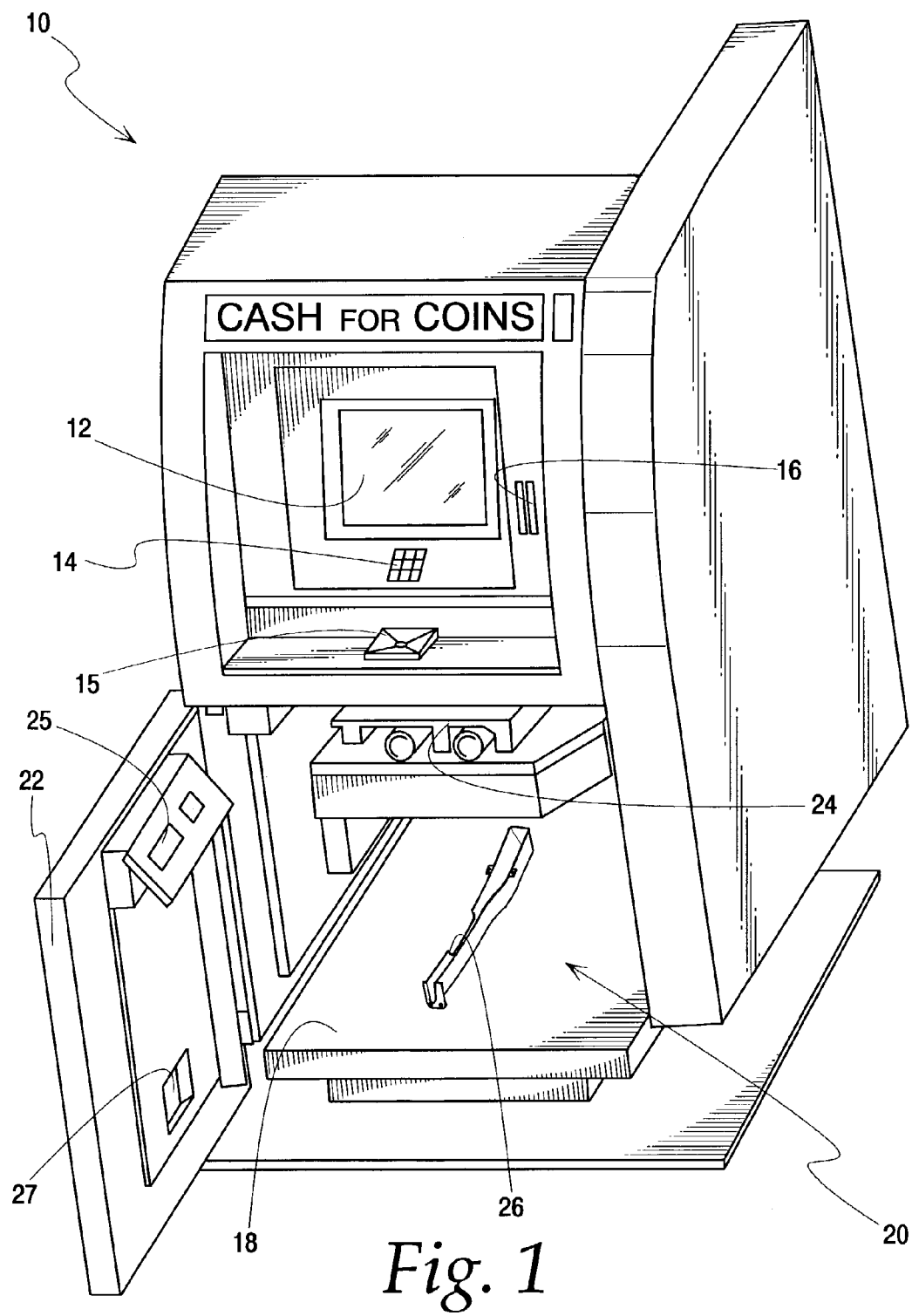
FIG. 1 is a perspective view of a coin chute and a coin redemption machine according to one embodiment of the present invention.
Figure 2:
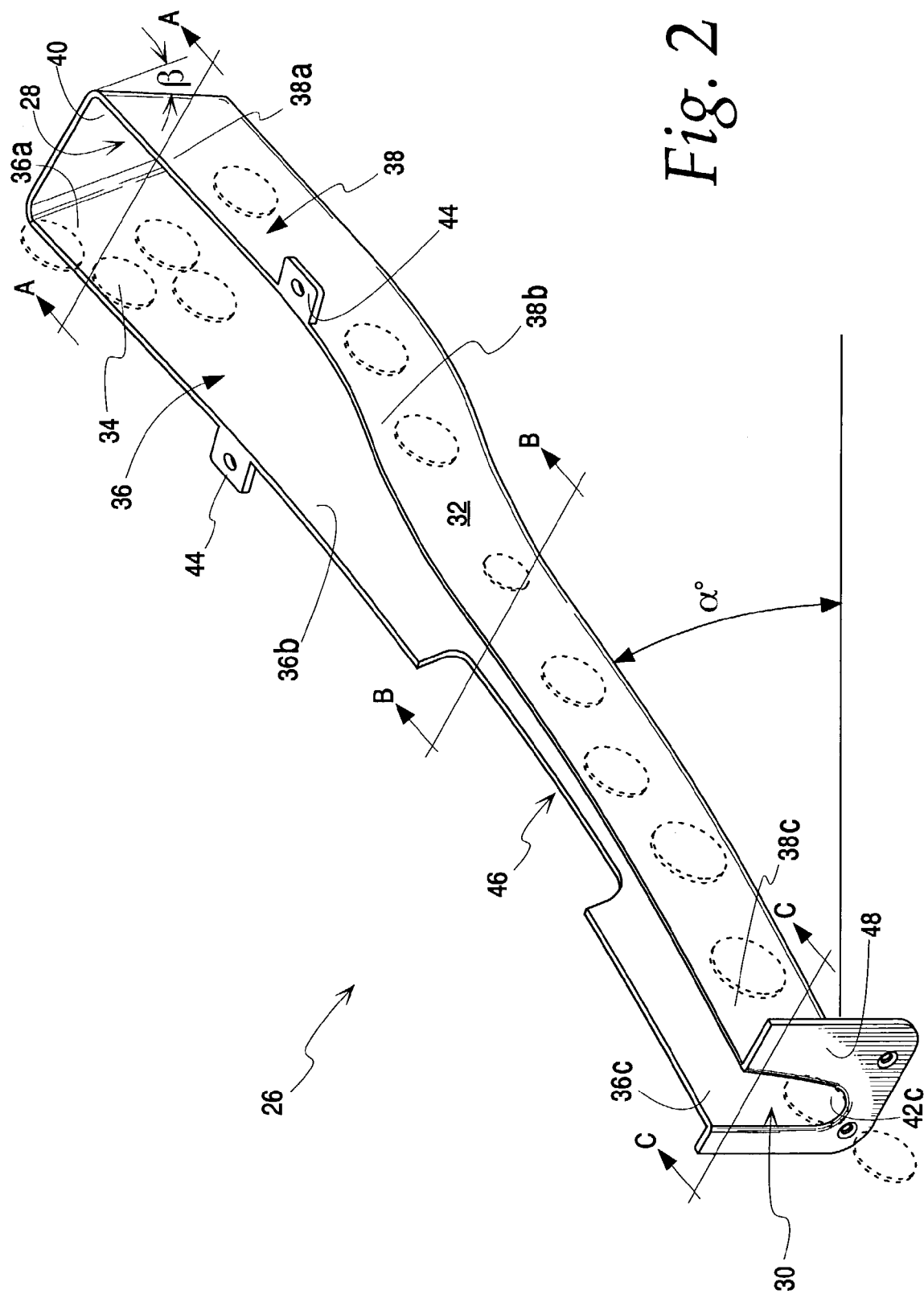
FIG. 2 is a perspective view of the coin chute of FIG. 1.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Referring to the drawings and initially to FIG. 1, a coin redemption machine 10 according to one embodiment of the present invention includes a touch screen 12 to provide inputs from a machine user and also to display outputs to be viewed by the user. While the touch screen 12 is the preferred mode to enter data from the user of the coin redemption machine 10, the coin redemption machine 10 may also include a mechanical keyboard or buttons 14 to receive such inputs.

The coin redemption machine 10 includes a coin input area 15 which receives coins of mixed denominations from a user. The coin input area 15 allows the user of the currency processing machine 10 to deposit the user's coins which will ultimately be converted to some other sort of fund source (i.e., banknotes, credit to a smartcard, credit to an account, credit for purchases in the store containing the redemption machine 10, etc.) that is available to the user.

As shown, the coin input area 15 is generally funnel-shaped to direct coins to a coin processing area within the machine 10. The coin input area 15 can include a gravity-feed coin input tray, and/or a coin tray that is pivotable from a first position, wherein the coin tray is substantially horizontal, to a second position, wherein the coin tray is lifted, causing the coins to slide under the force of gravity into the coin redemption machine 10.

In its simplest form, the coin redemption machine 10 receives coins via the coin input area, and after these deposited coins have been authenticated, sorted, and/or counted, the currency redemption machine 10 outputs a receipt to the user indicative of the dollar amount of the deposited coins. The currency processing machine 10 may include a paper dispensing slot for providing a user with the receipt of the transaction that the user has performed. The user can redeem the receipt for funds from an attendant of the coin redemption machine 10. An attendant may include a store employee such as a cashier at a grocery store or a teller at a bank. Alternatively, the user can redeem the receipt for credit towards purchases at the store where the machine is located and/or in exchange for merchandise at the store.

The coin redemption machine 10 also includes a media slot 16 into which the user may insert an account card (e.g., a bank card such as an ATM card, an identification card including the type distributed by grocery stores, smartcards, etc.). The media slot 16 is coupled to a media reader/writer device in the coin redemption machine 10 that is capable of reading from or writing to one or more types of media including ATM cards, credit cards, smartcards, or other types of media cards. This media may include various types of memory storage technology such as magnetic storage, solid state memory devices, and optical devices. The touch screen 12 typically provides the user with a menu of options which prompts the user to carry out a series of actions for identifying the user by displaying certain commands and requesting that the user depress touch keys on the touch screen 12 (e.g., a user PIN, account number, etc.).

After the coins have been processed, e.g., sorted, counted, and/or authenticated, they are transported to a coin container (not shown), such as a coin bin or a coin bag. The coin container is located on a container base 18 inside a coin storage area 20, which is accessible via a door 22. Coins can also be transported to a coin dispensing mechanism 24, which is located above the storage area 20, for dispensing appropriate coin change to customers via an opening 25 in the door 22. Occasionally, coins that do not meet authentication requirements are detected, e.g., metal slugs, foreign coins, bus tokens, etc. These coins are rejected and then transported to a reject outlet 27 in the door 22 via a coin chute 26. The coin chute 26 can be made of any solid material, such as a molded plastic or a metal. In one embodiment, the material is selected to be a fire retardant material.

Referring now to FIGS. 2–5, the coin chute 26 has a coin entry region 28, a coin exit region 30, and a middle region 32. Further, the coin chute 26 includes a first surface 36, a second surface 38, and a bridging section 42. The coin chute 26 is inclined at an angle α relative to the horizontal, wherein the inclination is required for using the force of gravity to move a plurality of coins 34 from the entry region 28 through the exit region 30. The shape and size of the coin chute 26 is designed such that it minimizes the angle α, which in turn means that the vertical space required for accommodating the coin chute 26 is minimal. In one of the preferred embodiments, angle α is less than about 15 degrees.

The entry region 28 receives coins 34 after they have been rejected and sent to the coin chute 26. The entry region 28 is located at one end of the middle region 32 and it is shaped to keep coins 34 from bouncing out of the entry region 28 and to direct the coins 34 toward the middle region 32. The entry region 28 includes three surfaces or sides: two opposing surfaces, the first surface 36a and the second surface 38a, and an end surface 40. The first surface 36 is referred to with suffixes "a," "b," and "c" to designate a particular region of the first surface 36 in the entry region 28, the middle region 32, and the exit region 30, respectively. Similarly, the second surface 38 is referred to with suffixes "a," "b," and "c" to designate a particular region of the second surface 38 in the entry region 28, the middle region 32, and the exit region 30, respectively.

Figure 3:
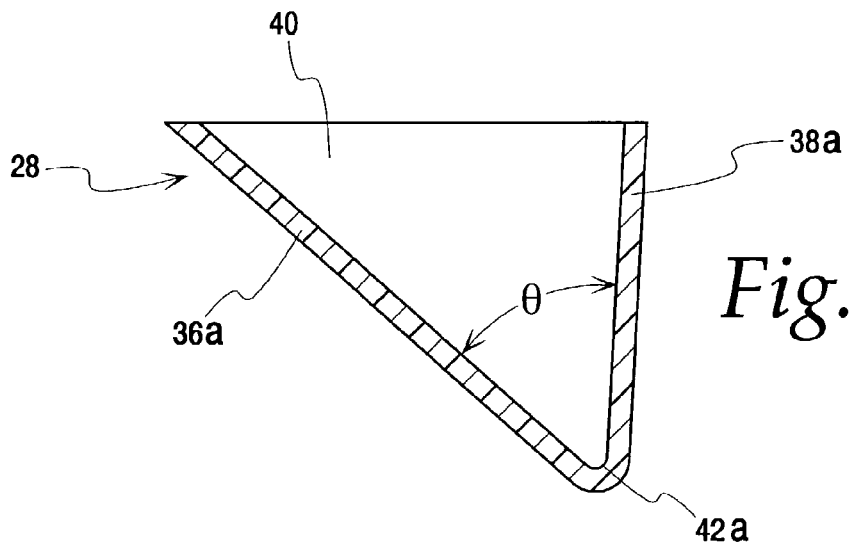
FIG. 3 is a cross-sectional view along plane AA of the coin chute of FIG. 2.

As can be seen in FIG. 3, the first surface 36a and the second surface 38a are connected at one end by a bridging surface 42a to give the entry region 32 a V-shaped profile. The bridging surface 42 is referred to with suffixes "a," "b," and "c" to designate a particular portion of the bridging surface in the entry region 28, the middle region 32, and the exit region 30, respectively. The bridging section 42a between the first surface 36a and the second surface 38a provides a sliding and/or rolling surface for moving the coins from the entry region 28 to the exit region 30. The first surface 36a and the second surface 38a are separated by an angle θ, wherein each of the first surface 36a and the second surface 38a are inclined at angles that are less than 90 degrees relative to the horizontal. For example, the first surface 36a can be inclined at an angle about 43 degrees relative to the horizontal, and the second surface 38a can be inclined at an angle about 87 degrees relative to the horizontal. The angle θ is selected to cause the coins 34 to move under a gravitational force and to slidably roll along the bridging surface 42a. In another embodiment, the angle θ is less than about 55 degrees, and preferably less than about 50 degrees.

The radius of the bridging surface 42a is selected to inhibit opposing coin edges from simultaneously contacting both the first surface 36a and the second surface 38a. Also, the bridging surface 42a can have a constant or variable thickness. The width of the first surface 36a and the width of the second surface 38a can be constant or variable. For example, in the embodiment shown in FIGS. 3–5, the width of the first surface 36a and the width of the second surface 38a can be wider near the entry region 28 than near the middle region 32. Further, the width of the first surface 36a can be different than the width of the second surface 38a. Similarly, the thickness of the first surface 36a and the thickness of the second surface 38a can be constant, can be variable, and/or can be different from each other.

The end surface 40 is connected to both the first surface 36a and the second surface 38a to form a closed end of the entry region 28, and it has a triangular shape, wherein the shape is defined in part by the angle θ. Thus, the entry region 28 has a closed end and an open end, the open end being coupled to the middle region 32. The end surface 40 is inclined at an angle θ relative to the vertical axis, the angle β being formed generally parallel to the length of the coin chute 26. The angle θ is dimensioned to limit coins 34 from bouncing within said entry region 28 or within middle region 32. In one embodiment the angle β is between about 25 degrees and 30 degrees.

Figure 4:
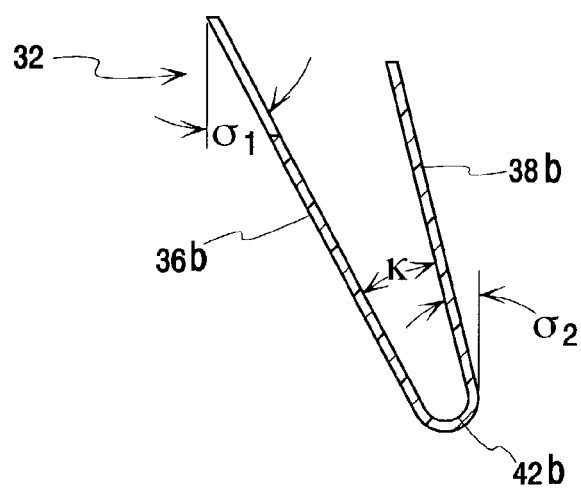
FIG. 4 is a cross-sectional view along plane BB of the coin chute of FIG. 3.

The middle region 32 has generally a similarly shaped cross-section as the cross-section of the entry region 28, and it includes the first surface 36b, the second surface 38b, and the bridging surface 42b. As shown in FIG. 4, the cross-section of the middle region 32 changes to a narrower V-shape profile than the profile of the entry region 28. The angle θ changes to a smaller angle κ, which is preferably any number generally equal to or smaller than the angle θ. The middle region 32 can have a constant profile, through the exit region 30, or it can have a variable profile. The variations in the profile, for example, include changing the angle θ by changing an angle σ1 relative to the vertical of the first surface 36b, by changing an angle σ2 relative to the vertical of the second surface 38b, or by changing the angles σ1 and σ2 of the first surface 36b and of the second surface 38b, respectively.

In general, after the entry region 28 receives the coins 34, a coin surface of each of the coins 34 slidably engages either the first surface 36a or the second surface 38a. Because of the force that gravity exerts on each of the coins 34, after slidably engaging either the first surface 36a or the second surface 38a, a coin edge of each of the coins 34 engages the bridging surface 42a. However, depending on the orientation of each of the coins 34 when they are received by the entry region 28, a coin edge of each of the coins 34 may engage the bridging surface 42a before a coin surface slidably engages one of the two entry surfaces, the first surface 36a or the second surface 38a, or the coin edge may engage the bridging surface 42a generally simultaneously with the coin surface slidably engaging one of the two entry sides. The coins 34, in general, slide along the bridging surface 42a and then start rolling along the bridging surface 42b before they exit at the exit region 30. The rolling movement of the coins 34 along the bridging surface 42b can be pure rolling, where the only contact between the coins 34 and the middle region 32 occurs between a coin edge and the bridging surface 42b, or it can be sliding rolling, where in addition to the contact between a coin edge and the bridging surface 42b there is also contact between a coin surface and one of the first surface 36b and the second surface 38b.

The middle region 32 can include additional features for varied purposes, such as securing the coin chute 26 to a coin chute support, or accommodating other internal components of the coin redemption machine 10. For example, a plurality of securing tabs 44 (shown in FIG. 2) can be provided for securing the middle region 32 to the coin redemption machine 10. Also, a cutout 46 (shown in FIG. 2) can be provided to prevent the coin chute 26 from interfering with other components, such as the coin dispensing mechanism 24.

Figure 5:
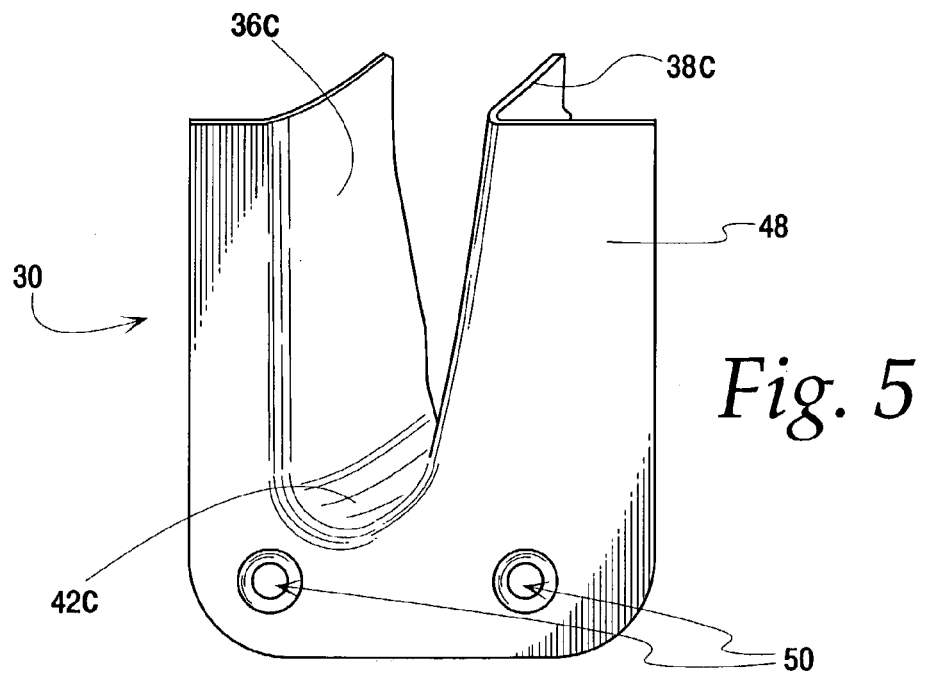
FIG. 5 is a cross-sectional view along plane CC of the coin chute of FIG. 4.

The exit region 30, shown more clearly in FIG. 5, provides an exit point for the transported coins and it includes the first surface 36c, the second surface 38c, and the bridging surface 42c, which end in a support plate 48. The support plate 48 includes a number of securing holes 50, which can be used to secure the exit region 30 to the coin redemption machine 10. Thus, the securing holes 50 and the securing tabs 44 are used together to secure the coin chute 26 to the coin redemption machine 10. The curvature of the bridging surface 42c is generally larger than the curvature of the bridging surface 42b, and the curvature of the bridging surface 42b is generally larger than the curvature of the bridging surface 42a. However, the change in curvature of each bridging surface 42a–42c is not essential to practicing the present invention.

In FIGS. 3–5, the cross-sectional profile of the exit region 30 is different than the cross-sectional profile of the middle region 32 and the cross-sectional profile of the middle region 32 is different than the cross-sectional profile of the entry region 28. However, these differences are not required for practicing the invention. The changes in the cross-sectional profile may be required by physical constraints, such as to prevent interference between the coin chute 26 and other internal components of the coin redemption machine 10. Thus, a coin chute 26 with a constant cross-sectional profile through the coin entry region 28, middle region 32, and exit region 30 is contemplated by the present invention. For example, such a coin chute 26 may have the profile of the entry region 28 along its entire length.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A coin chute for transporting coins in a coin processing machine, comprising:
    a first surface and a second surface generally forming a V-shape having an angle θ between said first and second surface, said first surface being nonparallel to said second surface for forming said V-shape; and
    a rolling surface connecting said first surface and said second surface, said rolling surface being inclined at an angle α relative to the horizontal, said angle θ and said angle α being selected to be values causing the coins to move under a gravitational force and slidably roll across said rolling surface.

2. The coin chute of claim 1, wherein said first surface has a variable width.

3. The coin chute of claim 2, wherein said second surface has a variable width.

4. The coin chute of claim 1, wherein said first surface is curved along its length.

5. The coin chute of claim 4, wherein said second surface is curved along its length.

6. The coin chute of claim 1, wherein said angle α varies along the length of said coin chute.

7. The coin chute of claim 1, wherein said angle α is less than about 15 degrees.

8. The coin chute of claim 1, wherein said angle θ is less than about 55 degrees at least in an entry region of said coin chute.

9. The coin chute of claim 8, wherein said angle θ is about 50 degrees.

10. The coin chute of claim 1, wherein said first surface has a number of regions including an entry region, a middle region, and an exit region, each of said regions having a curved shape.

11. A coin chute for transporting coins in a coin processing machine, comprising:
    a coin entry region for receiving coins;
    a coin exit region at which said coins exit said coin chute; and
    a middle region between said coin entry region and said coin exit region and having a generally V-shaped cross-section, said middle region being inclined at an angle α relative to the horizontal, said middle region including a rolling surface that is located between two opposing side surfaces of said middle region, said rolling surface being configured to cause coins to transition from a sliding motion to a rolling motion, said opposing sides being nonparallel to each other for forming said V-shaped cross-section.

12. The coin chute of claim 11, wherein said angle α is less than 15 degrees.

13. The coin chute of claim 11, wherein said rolling surface has a width selected to inhibit coins from being positioned such that opposing coin edges contact said two opposing side surfaces of said middle region.

14. The coin chute of claim 11, wherein said rolling surface is curved.

15. The coin chute of claim 11, wherein said V-shaped cross-section has an angle κ between said two side surfaces of said middle region, said angle κ being less than about 55 degrees.

16. The coin chute of claim 15, wherein said angle κ is about 50 degrees.

17. The coin chute of claim 11, wherein said rolling surface is wider near said exit region and narrower near said entry region for causing coin movement to transition from sliding movement to rolling movement.

18. The coin chute of claim 11, wherein a top edge of said coins leans against one of said side surfaces and a bottom edge of said coins rollingly engages said rolling surface.

19. The coin chute of claim 11, wherein said entry region receives coins from the vertical direction and is shaped to keep bouncing coins within said middle region.

20. The coin chute of claim 19, wherein said entry region includes an end surface for connecting said opposing side surfaces of said middle region near one end of said middle region.

21. The coin chute of claim 11, wherein said entry region includes an end surface connected to said side surfaces of said middle region, said end surface being shaped to incline at an angle β for limiting coins from bouncing within said middle region.

22. The coin chute of claim 21, wherein said angle β is between about 25 degrees and about 30 degrees.

23. A method of moving coins from one location to another within a coin chute, comprising:
  receiving coins in a coin entry region;
  slidably engaging a coin surface of said coins on a side surface of an inclined V-shaped transporting middle region, said middle region being inclined with respect to a horizontal plane, said side surface being nonparallel to another side surface of said V-shaped transporting middle region;
  engaging a coin edge of said coins on a rolling edge of said transporting middle region, said rolling edge connecting said side surface and said another side surface;
  rolling said coins along said rolling edge; and
  exiting said coins at a coin exit region.

24. The method of claim 23, wherein said receiving includes dropping said coins from a vertical position.

25. The method of claim 23, further comprising preventing said coins from bouncing within said middle region.

26. The method of claim 23, further comprising selecting an angle α for the horizontal position of said middle region.

27. The method of claim 23, further comprising dropping said coins in a coin bag.

28. A coin chute for transporting coins in a coin processing machine, comprising:
  an entry region for receiving coins and including a first entry surface, a second entry surface, and an end surface, said first entry surface being connected to said second entry surface along an entry bridging surface, said first entry surface and said second entry surface forming an entry V-shaped section, said end surface connecting said first entry surface and said second entry surface; and
  a transport region including a first transport surface and a second transport surface, said first transport surface being connected to said second transport surface along a transport bridging surface, said first transport surface and said second transport surface forming a transport V-shaped section, said first transport surface being nonparallel to said second transport surface, said entry V-shaped section being coupled to said transport V-shaped section and said entry bridging surface being coupled to said transport bridging surface, said entry bridging surface and said transport bridging surface being configured for allowing said coins to transition from a sliding motion to a rolling motion in response to the gravity force.

29. The coin chute of claim 28, wherein said entry V-shaped section has an angle θ between said first entry surface and said second entry surface, said transport V-shaped section has an angle κ between said first transport surface and said second transport surface, said angle θ having a value that is about the same or larger than said angle κ.

30. A coin chute for transporting coins in a coin processing machine, comprising:
  a first surface and a second surface generally forming a V-shape having an angle θ between said first and second surface, said angle θ varying along the length of said coin chute; and
  a rolling surface connecting said first surface and said second surface, said rolling surface being inclined at an angle α relative to the horizontal, said angle θ and said angle α being selected to be values causing the coins to move under a gravitational force and slidably roll across said rolling surface.

31. A coin chute for transporting coins in a coin processing machine, comprising:
  a coin entry region for receiving coins;
  a coin exit region at which said coins exit said coin chute; and
  a middle region between said coin entry region and said coin exit region and having a generally V-shaped cross-section, said middle region being inclined at an angle α relative to the horizontal, said middle region including a rolling surface that is located between two opposing side surfaces of said middle region, said rolling surface being configured to cause coins to transition from a sliding motion to a rolling motion, said V-shaped cross-section having an angle κ between said two side surfaces of said middle region, said angle κ having different values along the length of said middle region.

* * * * *